No Printed Specification Available
J. Snyder.
Truss Bridge.
No 7994X
Patented Feb. 3, 1834.
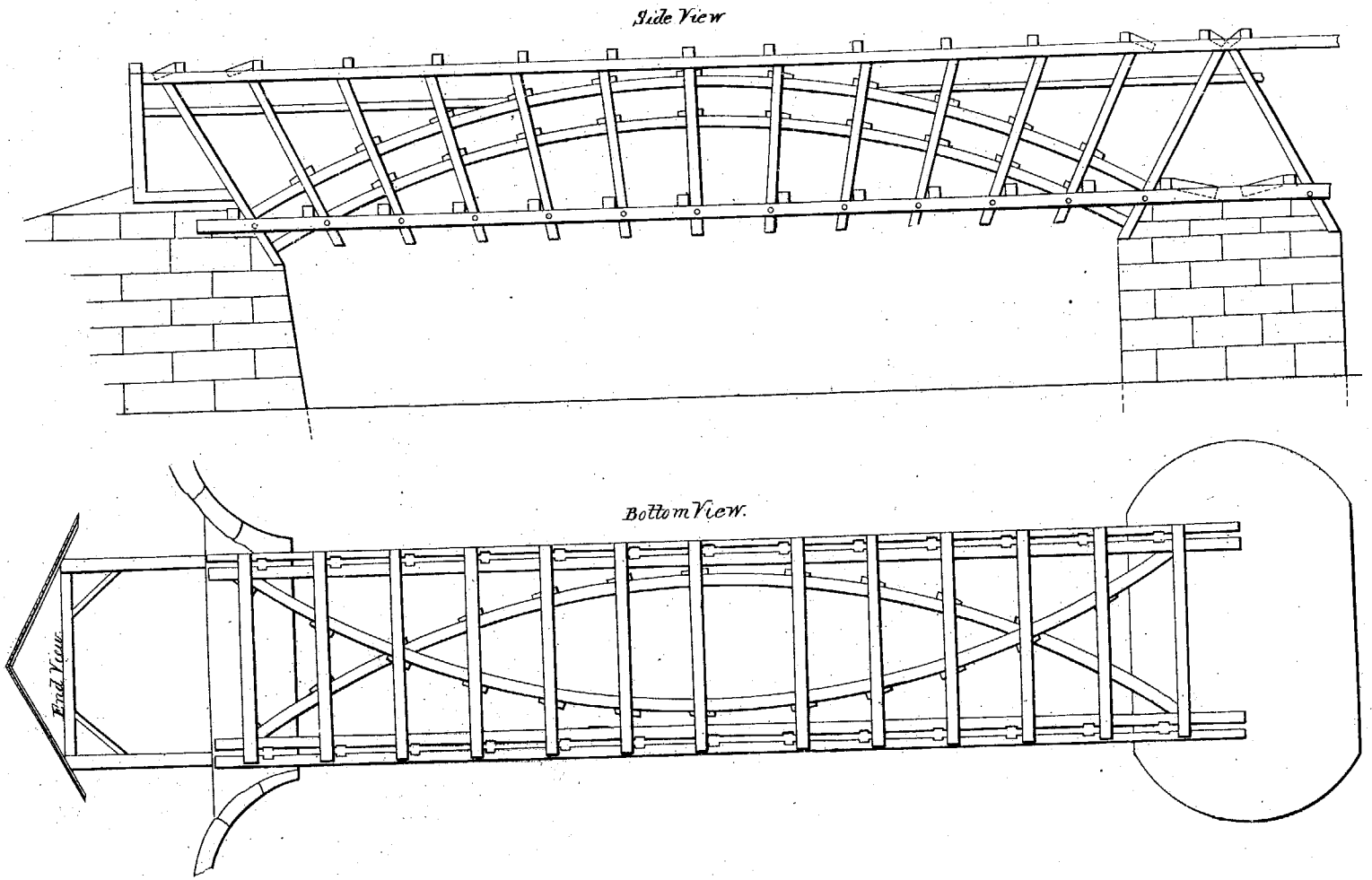
N. PETERS, PHOTO-LITHOGRAPHER, WASHINGTON, D. C.

Feb. 3 1834 21.

Jonas Snyder 79944

Letters Patent Feb. 3rd 1834.

The Schedule referred to in these Letters Patent and making part of the same containing a description in the words of the said Jonas Snyder him-self of his Improvement in the mode of Building Bridges

---

The Bridge to be constructed with double wooden cords between which the posts or uprights are placed running up to the plate about eight feet apart & set so as to lean outward from the centre toward the two ends of the bridge. The side of a bridge being so far framed, then one two or more arches are formed by tie braces running from post to post into which mortises are made to receive the tenons of said tie braces which tenons must exactly meet in the middle of each post the mortises are made so as to leave sufficient space above for keys of which one is placed in each post above the tie braces & room left below in order to give the keys play to tighten the tie braces thus formed into the shape of an arch tight & substantial, the first or lower arch thus formed is commenced on the outside or end posts about four or five feet below the cords & [illegible] in a regular arch from each end to meet in the centre of the bridge, the second arch of braces is also commenced on each end post immediately above the [illegible] in every respect constructed as the first. A small [illegible] may be put in with tenons from post to post about two feet below the plate [illegible] along the whole length of the bridge on the bottom part on the [illegible] cords are placed sills into which two horizontal arches are formed with plank or scantling running from the four corners from sills to sills thus mortised so as to [illegible] & then with keys to stiffen & straighten the bridge Witnesses
J. P. Mackinley
Daniel Snyder Jonas Snyder Inventor (Issued July 1834)